INVENTORS
RONALD E. GAITTEN
HENRY W. SIMPSON

BY

ATTORNEY

United States Patent Office 3,529,222
Patented Sept. 15, 1970

3,529,222
CONSTANT INPUT IMPEDANCE POWER SUPPLY CIRCUIT
Ronald E. Gaitten and Henry W. Simpson, Lexington, Ky., assignors to International Business Machines Corporation, Armonk, N.Y., a corporation of New York
Filed Jan. 16, 1968, Ser. No. 698,296
Int. Cl. H02p 5/40; H02m 5/40; H02j 1/04
U.S. Cl. 318—227                    8 Claims

ABSTRACT OF THE DISCLOSURE

A power supply circuit appears as a constant input impedance and load fluctuations are not reflected back to a power source. A regulator draws constant direct current from a rectifier that converts an alternating current supply to direct current voltage. The regulator supplies a varying direct current to a convertor which changes the regulated varying signal to an alternating varying signal for driving an alternating current reactive load. The varying direct current is derived by sensing the requirements of the convertor and the load. A compensating network associated with the convertor reduces effects of reactive energy from the load.

---

Figure 1:
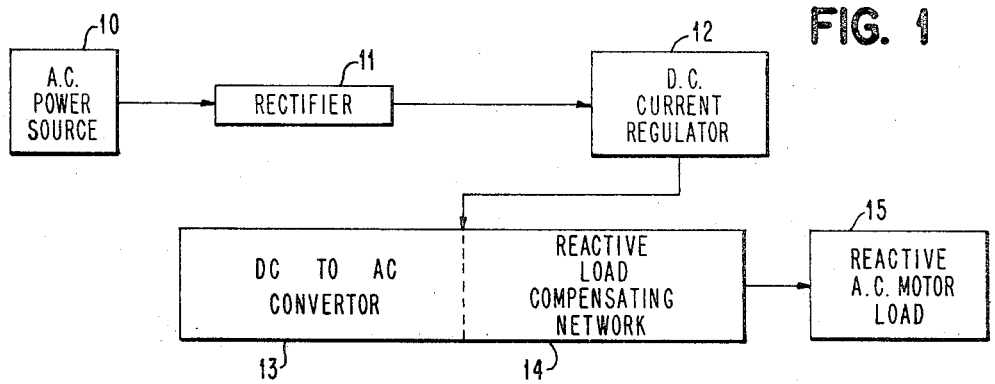

The present invention relates generally to power supplies. More particularly, this invention is concerned with providing a power supply circuit having a constant input impedance for furnishing electrical energy to a reactive load, such as the alternating current motors that power cyclically operated business machines.

In many electrical systems it is desirable to at least partially isolate either the power source or the load from the effects of fluctuations or variations in the other portion of the system. For example, variations in the power requirements for an alternating current motor driving an electric typewriter occur due to rapid changes in the mechanical loading of the motor when printing and other functional operations are performed.

It has, of course, previously been proposed to employ regulating circuits to minimize or eliminate the effects of changes or fluctuations in the operation of one portion of a system on another portion of the system. However, many of the prior art regulating circuits are not suitable for use in an environment of the type outlined above since most of the circuits are concerned with isolating the load from the effect of variations of the power source. The power supply circuit of this invention is for the purpose of isolating the variable power demands of the load from the power source and maintaining a constant input impedance to the power source to a degree which has not been obtained heretofore. Also, the prior art circuits are not able to provide the required bi-directional exchange of energy between a reactive load and the power supply circuit.

It is the primary or ultimate object of the present invention to provide a highly improved constant input impedance power supply circuit for delivering electrical energy to an alternating current load. The power supply circuit for an alternating current load appears as a constant input impedance at a particular phase angle to the main power source within relatively small tolerance limits. This is accomplished in part by rectifying the alternating signal from the main power source and then performing the required regulation on the direct current signal. By converting to direct current, the extremely difficult problem of regulating the phase angle of an alternating current signal is avoided. The regulated direct current signal is then converted to an alternating signal which is supplied to the load.

Another object of the invention is the provision of a power supply circuit comprising an energy storage and compensating network that permits the efficient transfer of energy in both directions between a reactive alternating current load and the power supply circuit. The energy which flows from the reactive load to the power supply when voltage across the load is reversed is stored and filtered by this network. The stored energy is transferred back to the load later in the operating cycle. The compensating network also serves to isolate other portions of the power supply circuit from the reverse surges of current which occur when the polarity of the load voltage is reversed.

A further object of the invention is to provide a constant input impedance power supply circuit which is capable of driving either one of or both of two load elements. Circuit means are incorporated to automatically adjust for an increase or a decrease in the number of individual load elements which make up the total load for the power supply circuit. The load in the illustrated embodiment of the invention comprises a pair of selectively energizable and reactive alternating current motors which are each employed to power a pair of cyclically operated electric typewriters.

A still further object of the invention is to provide a constant input impedance power supply circuit having the characteristics set forth above which is simplified in operation and is relatively inexpensive. Standard electrical components readily available from commercial sources are employed throughout the circuit.

The foregoing and other objects, features and advantages of the invention will be appartent from the following more particular description of a preferred embodiment of the invention, as illustrated in the accompanying drawings.

Figure 3:
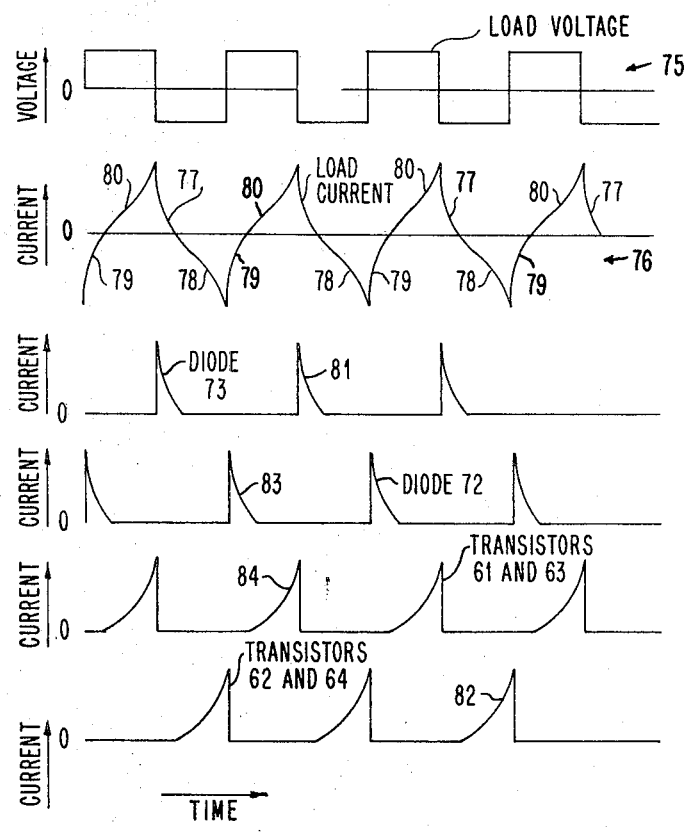
Figure 2:
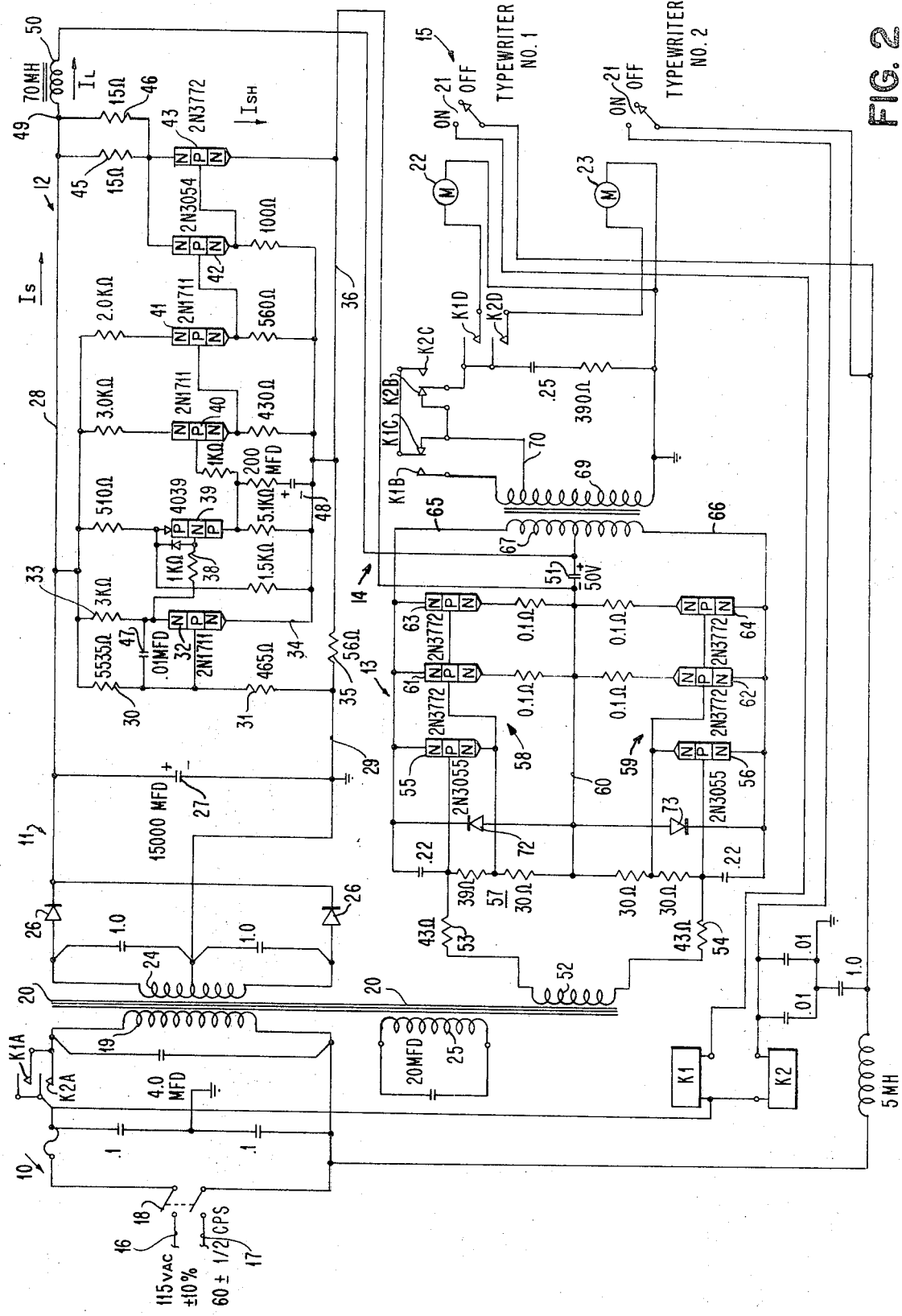

In the drawings:
FIG. 1 is a block diagram indicating the major functional grouping of the elements of the constant input impedance power supply circuit of this invention;
FIG. 2 is a schematic circuit diagram of the constant input impedance power supply circuit; and
FIG. 3 is a series of time based voltage and current curves observed at various points in the power supply circuit of FIG. 2.

Referring now to the drawings, and initially to FIG. 1 thereof, the various functional grouping of the elements forming the constant input impedance power supply circuit of the present invention are shown in block diagram form. The reference numeral 10 designates a source of alternating current voltage, such as a commercial 115 volt-15 ampere-60 cycle source provided by the conventional wall outlet. The power source 10 supplies an alternating current voltage to direct current full wave rectifier 11 whose output is in turn applied to a highly sensitive direct current regulator 12. The regulated signal is converted back to an alternating signal by converter 13 at a frequency dependent on the frequency of a synchronizing signal from the power source 10.

Associated with the converter 13 is an energy storage and reactive load compensating network 14. The convertor 13 and the compensating network 14 cooperate in supplying power to a reactive load 15. The load in the illustrated embodiment of the invention comprises either one or both of a pair of selectively energizable alternating current motors which drive a pair of cyclically operable electric typewriters. The compensating network 14, as will be hereinafter more fully explained, permits the transfer of energy in both directions between the power supply circuit and the reactive load 15. The energy flowing from the reactive load to the power supply circuit is stored and resupplied to the load at a later time in the operating cycle. The compensating network 14 also isolates the relatively sensitive current regulator 12 from high frequency fluctuations and the reactive surges of power which are transferred from the load to the power supply circuit. The overall operation of the power supply circuit is that the power source 10 sees a constant impedance load at a particular phase angle even though the power requirements of the reactive load 15 are continuously changing and fluctuating.

A detailed schematic circuit diagram is shown in FIG. 2 of the drawings and the various grouping of components forming the functional circuit elements have been indicated generally by the same reference numerals employed with the block diagram of FIG. 1. The alternating current power source 10 comprises a pair of supply conductors 16 and 17 which are connected to a conventional 115 volt-15 ampere-60 cycle power circuit by a main disconnect switch 18. The supply conductors 16 and 17 are adapted to supply power to the primary 19 of a ferroresonant step down transformer 20 through a pair of normally open relay contacts K1A and K2A of the relays K1 and K2, respectively. The energizing windings of the relays K1 and K2 are connected in circuits with the on-off switches 21 of the motors 22 and 23 which power a pair of typewriters providinng the load for the constant input impedacne power supply circuit. The typewriters are referably of the single element type disclosed in the IBM Customer Engineering Manual for Instruction for the IBM "Selectric" Typewriter, Form Number 241–5032–1, published in April 1964 by International Business Machines Corporation, Armonk, N.Y. The arrangement is such that when either of the switches 21 is moved to its on position, the corresponding relay K1 or K2 is actuated to close relay contacts K1A or K2A so that energy from the supply conductors 16 and 17 is supplied to the primary winding 19 of ferroresonant step down transformer 20. The ferroresonant transformer 20 also includes a center tapped secondary winding 24 and a resonant winding 25. Various decoupling capacitors are connected across the windings of the ferroresonant transformer as is conventional in the art.

The rectifier 11 is connected to the secondary winding 24 of the transformer 20 and comprises a pair of half wave rectifying devices or diodes 26 and a capacitor 27. The alternating current voltage from the supply conductors 16 and 17 is transformed to a lower voltage and converted to a direct current voltage which appears across conductors 28 and 29 and serves as the input of the direct current regulator 12. The direct current voltage will have a slight alternating current ripple but this ripple does not adversely effect the operation of the other portions of the power supply circuit.

The direct current regulator 12 comprises a pair of precision resistors 30 and 31 which are connected in series across the conductors 28 and 29 to provide a voltage dividing network. A transistor 32 of the NPN type has its base connected to the node between the resistors 30 and 31 while its collector is connected to the conductor 28 by collector or load resistor 33. The base-emitter circuit for the transistor 32 comprises resistor 31 of the voltage dividing network, a relatively small valued feedback or sensing resistor 35 and conductor 34.

The sensing resistor 35 is connected between conductor 29 and a conductor 36 leading to the direct current to alternating current converter 13 and compensating network 14. The sensing resistor 35 is interconnected with the converter 13 and compensating network 14 in such a manner that the resistor has a voltage drop across it which corresponds to the instantaneous current requirements of these elements. Also, it is noted that the resistor 31 in the voltage dividing network will have a voltage drop across it which is directly related and varies in accordance with any changes in the supply voltage. The transistor 32 is normally conducting to an extent determined by the current flowing in its base-emitter circuit. This, in turn, is controlled by the voltage drops occurring across the resistors 31 and 35. In essence, the transistor 32 provides a comparator-amplifier stage whose conduction is dependent on the voltage of the direct current power supply and the requirements of the converter 13 and compensating network 14 which power the load 15.

The extent of conduction of the transistor 32 determines the voltage drop across its collector resistor 33 and this signal, which is also directly related to the supply voltage and the requirements of the convertor 13 and compensating network 14 for powering the reactive load 15, is amplified and employed to regulate the power supplied from the rectifier 11. The collector of transistor 32 is connected via a resistor 38 to the base of a transistor 39 which is arranged in a circuit to serve as a voltage preamplifier stage. The output of this voltage preamplifier stage is further amplified by a low level current preamplifier stage provided by transistors 40 and 41. The amplified signals from the low level current preamplifier stage are coupled to a pair of transistors 42 and 43 which define an amplifying output stage. The extent of conduction of the transistor 43 determines the portion of the available current that will flow from the conductor 28 through a pair of parallel related shunt load resistors 45 and 46 and through this transistor to ground via sensing or feedback resistor 35.

All of the transistors 32 and 39–43 are biased to be normally conducting in the linear ranges of their characteristic curves and to provide the comparison, amplifying and current regulating functions indicated. Capacitor 47 and resistor-capacitor network 48 are employed to maintain a controlled gain-phase characteristic attenuation with increasing frequency to insure the stability of the extremely high gain and sensitive feedback amplifier of the regulator 13. Since the construction and organization of these transistor circuits will be readily understood by those skilled in the transistor arts by referring to the drawings, they will not be described further in the present specification. The values of the various circuit components and the types of transistors employed in a constructed embodiment of the invention have been specified on the schematic circuit diagram of FIG. 2 of the drawings to assist in any detailed analysis of the operation of the intermediate transistor stages.

The transistor 43 and resistors 45 and 46 act as an adjustable shunt for regulating the current which is permitted to flow from the rectifier 11. The current available at the current node 49 at the output of the direct current regulator 12 is the supply current $I_s$. This current is divided between the load current $I_L$ and the shunt current $I_{SH}$ that flows through the shunt path to ground. The value of the shunt current $I_{SH}$ is controlled by a comparison between an input signal from the power source and a feedback signal from the convertor 13 and compensating network 14. The comparison function is performed by the comparator amplifier stage including transistor 32 in the manner set forth above.

The output signal from the current regulator 12 is supplied to the conveyor 13 by way of an inductance 50 providing a low pass filter and a capacitor 51 which form a portion of the reactive load compensating network 14. The inductance 50 serves to isolate the direct current regulator 12 and the power source 10 from high frequency transient signals which may occur due to the reactive current exchange between the load 15 and the convertor 13 and, to a much lesser extent, the rapid changes in the mechanical loads applied to the motors 22 and 23. The capacitor 51 is extremely important in accomplishing the objects of the invention and is normally charged by the output of the direct current regulator with the polarity indicated in the schematic circuit diagram.

The convertor 13 is operative to convert the direct current voltage appearing across capacitor 51 to an alternating square wave voltage having the same frequency as the frequency of the power source. The synchronizing signal which determines the frequency of the alternating square wave supplied to the reactive load 15 is furnished by an auxiliary secondary winding 52 of the ferroresonant transformer 20. The opposite ends of the auxiliary secondary winding 52 are connected by resistors 53 and 54 to the bases of NPN type transistors 55 and 56. The resistors 53 and 54, in combination with other resistors connected across the secondary winding 52, provide a resistance driving and biasing network 57.

The input transistors 55 and 56 are component parts of identical chopping circiuts 58 and 59 which are connected to and positioned on oppoiste sides of the center conductor 60 in back-to-back relation. Each of the chopping circuits comprises one of the input transistors 55 and 56 connected in a conventional Darlington configuration with a pair of parallel output transistors 61 and 63, or 62 and 64, respectively. During positive half cycles of the alternating current supplied by the transformer winding 52, the transistors 55, 61 and 63 are rendered conductive while the corresponding transistors in the symmetrical chopping circuit 59 of the convertor are biased to their nonconducting states. Similarly, the transistors 56, 62 and 64 are conductive and the transistors of chopping circuit 58 are not conductive during negative half cycles of the synchronizing alternating current signal supplied from the auxiliary secondary winding of transformer 20.

A pair of conductors 65 and 66 connect the chopping ciruits 58 and 59 with the opposite end terminals of a center tapped primary winding 67 of load transformer 68. A center conductor 60 is connected to the negative terminal of the capacitor 51 and extends to the middle of the resistance driving and biasing network 57. It is noted that the chopping circuit 58 is connected between center conductor 60 and conductor 65 while the symmetrical chopping circuit 59 is connected between center conductor 60 and conductor 66.

During positive half cycles of the synchronizing signal, the conduction of the transistors 55, 61 and 63 completes a discharge path for the capacitor 51 which can be traced from the positive terminal of capacitor 51, the upper half of the center tapped primary winding 67 of load transformer 68, conductor 65, parallel connected transistors 61 and 63 and their emitter resistors and conductor 60 to the negative terminal of the capacitor 51. During negative half cycles of voltage from auxiliary secondary winding 52, the transistors 56, 62 and 64 are conductive and current flows in a path from the positive terminal of capacitor 51, the lower half of primary winding 67 of load transformer 68, conductor 66, parallel connected transistors 62 and 64 and their emitter resistors, and conductor 60 to the negative side of capacitor 51. The arrangement is such that square wave voltage pulses are alternately applied across the upper and lower halves of the center tapped primary winding 67 of load transformer 68.

The secondary winding 69 of the load transformer 68 is connected through a number of contacts of the relays K1 and K2 to the alternating current motors 22 and 23. The relay contacts are connected so that a greater number of turns of the secondary winding 69 of the load transformer 68 are connected in the powering circuits for the motors 22 and 23 if both of the typewriters are being used. For example, if the on-off switches 21 and 22 are both closed, the connection is made through the relay contacts K1B, K2C and K1D and K2D whereby the motors are connected across all of the windings of the secondary 69 of transformer 68. However, if only the on-off switch 21 for motor 22 is closed, the circuit extends from intermediate tap 70 of the load transformer secondary winding 69 through relay contacts K2B and K1D. Similarly, actuation of switch 21 for motor 23 while the other switch is off will complete an energizing circuit which includes the intermediate tap 70 of the load transformer secondary winding 69 and relay contacts K1C, K2C and K2D. In this manner the voltage supplied to the load is automatically adjusted in accordance with whether one or both of the typewriters are being employed.

In addition to the inductance 50 and capacitor 51, the reactive load compensating network 14 comprises a pair of diodes 72 and 73 which are connected in back-to-back relation with respect to each other. The anodes of the diodes are both referenced to the center conductor 60 leading to the negative terminal of capacitor 51 while their cathodes are connected to conductors 65 and 66 which extend to the opposite end terminals of the primary winding 67 of the load transformer 68. The diodes are arranged to provide circuit paths for the reactive currents which flow in the reverse direction in the convertor circuit when the polarity of the voltage pulses applied to the reactive load are reversed. The direction of current flow in the reactive load cannot be reversed instantaneously. The continued flow of current in one direction in the load after the voltage has been reversed causes the flow of energy back into the power supply circuit until such time that the inductive current in the load is reduced to zero. The operation of the diodes 72 and 73 and the other elements of the compensating network 14 will perhaps best be understood when considering the overall operation of the constant impedance power supply circuit with reference to the voltage waveforms shown in FIG. 3 of the drawings.

The curves 75 and 76 in FIG. 3 of the drawings illustrate typical voltage and current waveforms, respectively, that appear at the reactive load. The voltage at the load is an alternating square wave as would be expected considering the action of the chopping circuits 58 and 59 and the synchronizing signal supplied from the auxiliary secondary winding 52 of the ferroresonant transformer 20. The load is reactive and the load current cannot change its direction instaneously and therefore lags the voltage. When the polarity of the voltage changes from a positive to a negative, the current continues to flow in the same direction in the load, but decays exponentionally to zero as indicated by the load current curve portions 77. The current then begins to flow through the load in the opposite direction and builds up exponentially as depicted by curve portions 78 until the voltage is again reversed. After the next reversal of the polarity of the voltage, the current continues to flow in the same direction, although decreasing exponentially to zero as indicated by curve portions 79 and then rises exponentially in the opposite direction along curve portions 80.

During the periods that the current in the load continues to flow in the same direction after the voltage has reversed direction as indicated by load current curve portions 77 and 79, energy is transferred back to the compensating network 14. At other times as represented by load current curve portions 78 and 80, the transfer of energy is in the opposite direction from the convertor 13 and the compensating network 14 to the reactive load. There is more area under the curve portions 78 and 80 as compared to the area under the curve portions 79 and 77 so that the net transfer of power is in a direction from the convertor and compensating network to the load.

Considering now the operation of the convertor and compensating network in supplying energy to and receiving energy from the load, it will be assumed that the system is operating under a steady state condition and the voltage has just reversed its polarity from a positive to a negative value. During the curve portion 77 when the load current is falling exponentially to zero, current flows through the lower portion of the center tapped primary 67 of the transformer 68 in a direction to charge capacitor 51 and through the diode 73. This is represented by current curve 81 in FIG. 3 of the drawings. When the load current reaches zero, the capacitor 51 begins to discharge through the lower half of the center tapped primary winding 67 of transformer 68 and through conducting transistors 62 and 64 as represented by curve 82 and the current begins to build up exponentially in the negative direction in the load along curve portion 78.

When the load voltage is again reversed, the reactive current now flows through the upper half of the primary winding 67 to charge capacitor 51 and cause forward conduction of diode 72 as represented by current curve 83. Diode 72 will continue to conduct until the load current reaches zero. Then current flows from the capacitor 51 about the circuit loop comprising the upper half of the primary winding 67 and the conducting transistors 61 and 63 of the chopping circuit 58. The graph of the current flowing through the transistors 61 and 63 is shown at 84 in FIG. 3 of the drawings.

The voltage and current curves 75 and 76 represent a steady state condition relative to the power required by the load 15. In the illustrated embodiment of the invention, the typewriters will be actuated to print or perform other functions associated with a typing operation. Each time a typewriter is actuated, the mechanical load driven by the associated electric motor 22 or 23 will increase substantially and the motor will require more power from the power supply circuit. The shape of the current curve 76 will vary in accordance with the fluctuating demands of the load, but the overall operation of the circuit is as described above with the entire power supply circuit and load appearing as a load having a constant input impedance at a predetermined phase angle to the power source.

It should now be apparent that the objects initially set forth have been accomplished. The entire power supply circuit and the varying load appear as an unchanging and constant impedance load to the power source. The conversion of the alternating current supply voltage to a direct current voltage permits the current regulating function to be performed in a highly sensitive and relatively inexpensive manner. A constant direct current is drawn from the direct current source and a portion of the current which varies in accordance with the requirements of the load is supplied to the convertor and compensating network for conversion to an alternating current signal. Of particular importance is the arrangement wherein the compensating network permits the exchange of energy back and forth between the power supply circuit and the reactive load. The variations in power requirements and operating transients of the reactive load are isolated from and not reflected back to the power source. The power supply circuit also includes an arrangement for automatically increasing the output voltage when an additional load element is added to the load.

While the invention has been particularly shown and described with reference to a perferred embodiment thereof, it will be understood by those skilled in the art that the foregoing and other changes in form and details may be made therein without departing from the spirit and scope of the invention.

What is claimed is:

1. Apparatus for supplying electrical energy to a varying alternating current load comprising:
   an alternating current power source supplying an alternating current voltage;
   means to rectify said alternating current voltage to provide a direct current voltage source;
   regulator means drawing a constant direct current from said direct current voltage source;
   said regulator means comprising means to divide said constant direct current to provide a direct current signal whose value varies in accordance with the requirements of said load;
   convertor means for changing said direct current signal from said regulator means to an alternating current signal;
   supply means for supplying said alternating current signal to said load; and
   said varying alternating current load appearing as a load having a constant input impedance to said alternating current power source.

2. Apparatus according to claim 1, further characterized by:
   said alternating current load being reactive;
   a compensating network associated with said convetor means;
   said compensating network comprising an energy storage device; and
   circuit means for connecting said energy storage device in a circuit to be charged by said direct current signal whose value varies in accordance with the requirements of said load and for storing energy which is transferred to said convertor means and said compensating network from said load.

3. Apparatus according to claim 2, further characterized by:
   said convertor means comprising a pair of chopping circuits connected in back-to-back relation; and
   said circuit means comprises a pair of rectifying devices connected in back-to-back relation in bypassing parallel relation with said chopping circuits.

4. Apparatus for powering a cyclically operable business machine having a plurality of selectively actuatable functions comprising:
   an alternating current motor drivingly connected to said cyclically operable business machine;
   said business machine increasing the mechanical load driven by said alternating current motor when any of said selectively actuatable functions are initiated whereby the electrical power requirements of said alternating current motor are subject to fluctuation;
   an alternating current power source supplying an alternating current voltage;
   means to rectify said alternating current voltage to provide a direct current voltage source;
   regulator means drawing a constant direct from said direct current voltage source;
   said regulator means connected with said means to rectify to provide a direct current signal whose value varies in accordance with the requirements of said alternating current motor;
   convertor means for changing said direct current signal to an alternating current signal;
   supply means for supplying said alternating current signal from said convertor means to said alternating current motor; and
   said alternating current motor appearing as a load having a constant input impedance to said alternating current power source.

5. Apparatus according to claim 4 further characterized by:
   said convertor means comprising energy storage means coupled to said load; and
   said energy storage means storing energy which is transferred to said convertor means from said load when the polarity of the voltage supplied to said alternating current motor is reversed.

6. The method of supplying electrical energy from an alternating current source to an alternating current load so that said load appears as a load having a constant input impedance to said alternating current source comprising the steps of:
   rectifying the alternating current voltage from said power source to provide a direct current voltage source;
   drawing a constant direct current from said direct current voltage source;
   regulating said constant direct current to provide a direct current signal which varies in accordance with the requirements of said load;
   converting said varying direct current signal to an alternating current signal; and
   supplying said alternating current signal to said alternating load.

7. The method according to claim 6, further characterized by the steps of:
   storing reactive electrical power which is transferred from said load to the converting apparatus; and thereafter supplying the stored electrical power back to said load.

8. The method of regulating the electrical energy supplied from an alternating current source to an alternating current load so that the load appears as a load having a constant input impedance at a constant phase angle to said alternating current source comprising the steps of:

rectifying the alternating current voltage from said power source to provide a direct current voltage source;

drawing a constant direct current from said direct current voltage source;

sensing the requirements of said alternating current load and dividing said constant direct current to provide a direct current signal which varies in accordance with the requirements of said varying load;

converting said varying direct current signal to an alternating current signal; and supplying said alternating current signal to said alternating current load.

References Cited

UNITED STATES PATENTS

| | | | |
|---|---|---|---|
| 3,337,787 | 8/1967 | Joseph | 321—2 |
| 3,328,664 | 6/1967 | Baude | 321—11 |
| 3,376,489 | 4/1968 | Crayton | 323—4 |
| 3,383,584 | 5/1968 | Atherton | 323—22 |
| 3,402,336 | 9/1968 | Risberg | 318—231 X |
| 3,324,378 | 6/1967 | Kupferberg et al. | 321—18 |
| 3,365,650 | 1/1968 | Camp et al. | 321—18 |
| 3,403,318 | 9/1968 | Krauthamer et al. | 321—16 X |

W. H. BEHA, Jr. Primary Examiner

U.S. Cl. X.R.

318—229; 321—2, 11; 323—8